United States Patent [19]

Fonteneau

[11] 3,969,611
[45] July 13, 1976

[54] THERMOCOUPLE CIRCUIT

[75] Inventor: Norman O. Fonteneau, Acushnet, Mass.

[73] Assignee: Texas Instruments Incorporated, Dallas, Tex.

[22] Filed: Dec. 26, 1973

[21] Appl. No.: 427,942

[52] U.S. Cl. .............................. 219/502; 219/501
[51] Int. Cl.² ......................................... H05B 1/02
[58] Field of Search ............ 73/361, 362.5; 330/23, 330/143; 331/69; 328/269; 219/502, 504, 505, 501, 497

[56] References Cited
UNITED STATES PATENTS

| | | | |
|---|---|---|---|
| 3,028,473 | 4/1962 | Dyer et al. | 330/23 X |
| 3,381,212 | 4/1968 | Peltola et al. | 219/502 X |
| 3,453,450 | 7/1969 | Evalds | 219/502 X |

*Primary Examiner*—Gerald Goldberg
*Assistant Examiner*—Fred E. Bell
*Attorney, Agent, or Firm*—John A. Haug; James P. McAndrews; Russell E. Baumann

[57] ABSTRACT

A thermocouple circuit has dissimilar conductors joined to form a conventional temperature transducer located in a zone to be monitored or controlled. The opposite ends of these conductors are connected to similar metal leads in a capsule located in a stable oven to form a reference junction. The oven also houses an inexpensive integrated circuit operational amplifier which is electrically connected to the similar metal leads to yield a high gain output signal proportional to the weak thermal e.m.f. in the dissimilar conductors. This signal is compared to a preset reference voltage level and the difference signal converted to a temperature correction signal which is in binary form. The oven, the operational amplifier, and the binary signal producing circuitry are all driven by a power source which has as its reference or common potential an isolated voltage level tapped off the shielded secondary winding of an otherwise conventional transformer. The binary signal is de-isolated by providing an optical coupler to other non-isolated equipment for operation of a heater located in the zone.

6 Claims, 3 Drawing Figures

THERMOCOUPLE CIRCUIT

CROSS REFERENCE TO RELATED APPLICATIONS

The disclosure herein is identical to that of a patent application in the name of Francis Finnegan bearing the same title and filed Apr. 2, 1974 under Ser. No. 427,863 and assigned to the assignee hereof.

SUMMARY OF THE INVENTION

This invention relates generally to thermocouple circuits, and deals more particularly with a circuit for amplifying the relatively weak thermal e.m.f. generated in the loop formed by the dissimilar thermocouple conductors.

The thermal e.m.f. is initially amplified by a monolithic integrated circuit operational amplifier as described in the above mentioned copending patent application, and an isolated reference potential is provided both for the operational amplifier, and also for a differential amplifier tied to a sensitive potentiometer and capable of providing a "difference" signal indicative of the difference between a preset temperature and the actual temperature sensed by the thermocouple.

Basically, a source of A. C. power is fed to a transformer which has its secondary winding shielded and center-tapped to provide the isolated reference voltage. A diode bridge type of rectifier is driven by the secondary winding, and is also referenced to the same potential to provide a stable source of symmetrical D. C. power. This D. C. power drives both the operational amplifier and the differential amplifier, and also suitable readout equipment. The system also provides for temperature control, as well as temperature monitoring, and a binary signal for such control is "de-isolated" for use in driving conventional heating components through an optical coupling device.

DETAILED DESCRIPTION

Figure 1:
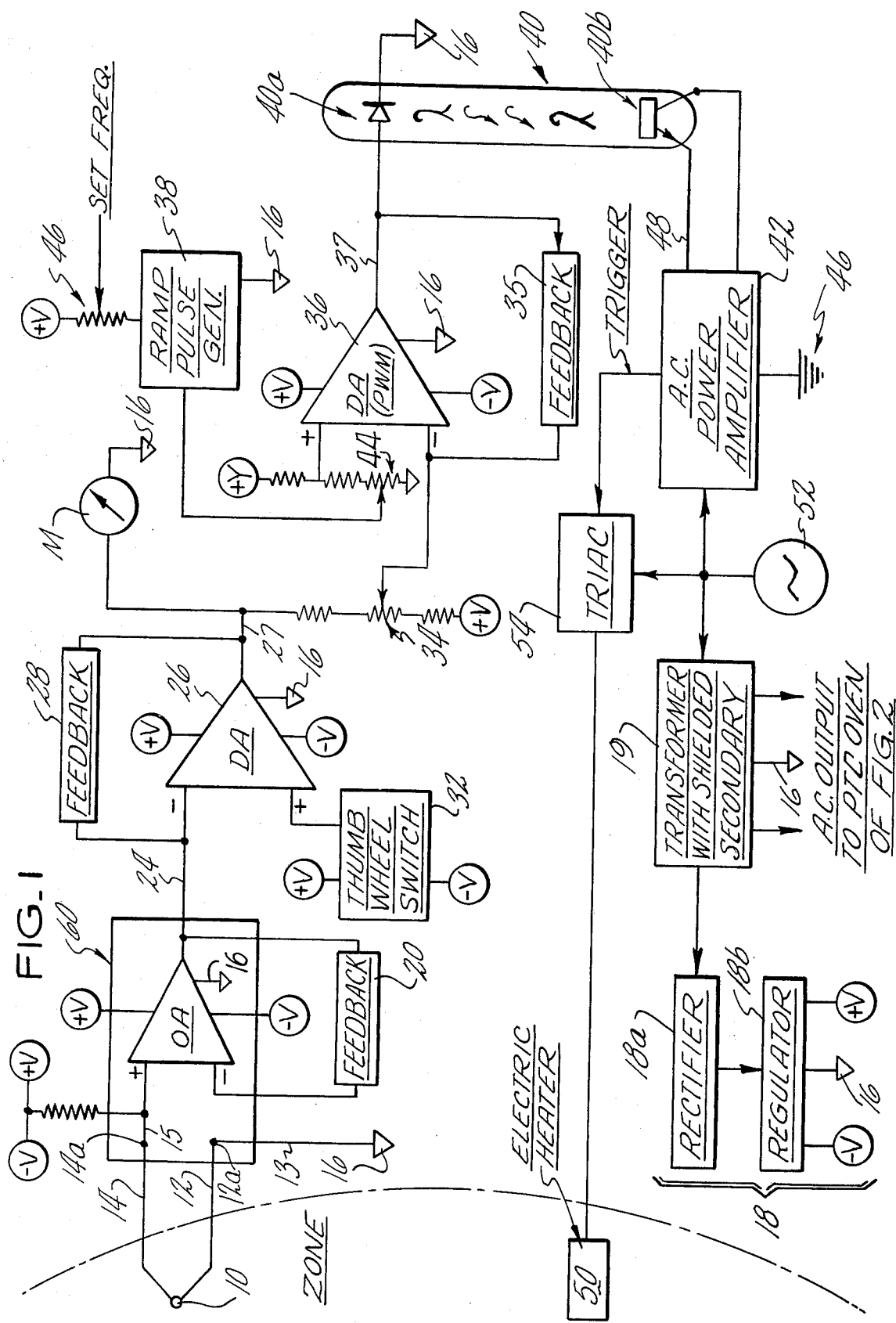
FIG. 1 is a schematic view of a temperature monitoring and controlling system incorporating the present invention.

Turning now to the drawings in greater detail, FIG. 1 shows a conventional thermocouple junction or transducer 10 formed by the connection between adjacent end portions of two dissimilar conductors 12 and 14. The opposite ends of these conductors 12 and 14 (indicated at 12a and 14a respectively) are electrically connected to similar metal leads 13 and 15 resectively in accordance with conventional thermocouple practice to form a reference junction.

Figure 2:
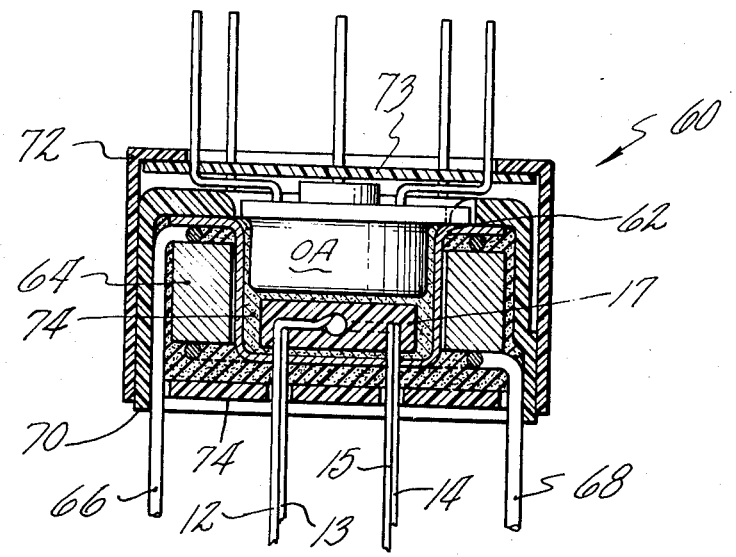
FIG. 2 is a vertical sectional view through a component oven, and its contents, of the type depicted schematically in FIG. 1.
Figure 3:
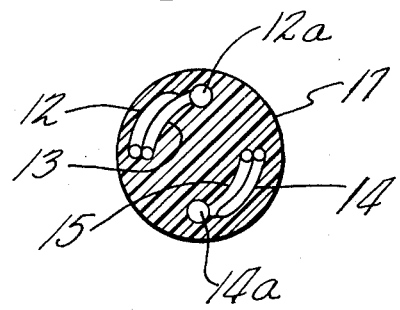
FIG. 3 is a horizontal sectional view through the capsule shown in the FIG. 2 oven.

FIGS. 2 and 3 show the physical connections 12a and 14a between the thermocouple conductors 12 and 14, and their associated similar non-critical lead out wires 13 and 15. As shown in FIG. 3, the junctions 12a and 14a are defined in a capsule 17 which is generally cylindrical in shape, and which is adapted to be mounted in a component oven best shown in FIG. 2. The oven 60 will be described in greater detail hereinbelow and is indicated schematically in FIG. 1. Briefly, said oven 60 comprises a conventional element of the combination herein, being of the general type shown and described in U.S. Pat. No. 3,414,705 issued Dec. 3, 1968 and assigned to the assignee herein. An oven of this general type is adapted to be driven from either a source of A.C. or D.C. power, and in accordance with the present invention is preferably driven by the secondary winding of a transformer 19. The transformer preferably is of the shielded type, and it is a feature of the present invention that the secondary winding has a center tap 16 which provides a convenient isolated common or reference potential not only for the secondary winding which drives the component oven of FIG. 2 but also for other components of the system to be described.

A conventional source of A.C. power is indicated generally at 52 in FIG. 1, and provides a source of A.C. electrical energy to the primary winding of the transformer 19. The shielded secondary winding of the transformer 19 provides A.C. electrical energy to a unit 18, and more particularly to a rectifier of the diode bridge type 18a. The unit 18 also includes a conventional regulator 18b, and the unit 18 provides a symmetrical D.C. voltage output represented generally by $(+V)$ and $(-V)$ both of which outputs are referenced to the isolated common potential 16 defined by the center tap on the shielded secondary winding of the transformer 19.

The thermocouple reference junction 12a is shown in FIG. 1 to be electrically connected to the isolated common potential 16, and the thermocouple reference junction 14a provides the positive input to an inexpensive operational amplifier OA and such operational amplifier OA is driven by the symmetrical source of D.C. power provided by the unit 18 with a feedback loop 20 for decreasing the gain of the amplifier OA and for passing signal frequencies within a predetermined bandwidth. By way of example, an operational amplifier of this general type, sold by the assignee herein under Model No. 52741 is capable of amplifying a relatively weak signal on the order of 25 microvolts per degree Fahrenheit to the more readily useable level of 5 millivolts per degree Fahrenheit. It is characteristic of this type operational amplifiers generally, however, that the output thereof is not reliable from the point of view of temperature drift especially for input signals of this magnitude. Therefore, an operational amplifier of this general type is not usually suitable for amplifying relatively weak signals, such as the 25 microvolts per degree signal in a thermoelectric loop without temperature stablization. A typical inexpensive integrated circuit operational amplifier may be expected to have a thermal drift on the same order of magnitude as the signal strength itself in a thermocouple sensing circuit. Therefore, the inexpensive high gain amplifier OA is stabilized to overcome its inherent disadvantages by stabilizing its environment in the system described herein.

An important feature of the present disclosure is that the operational amplifier OA is provided in the same stable oven 60 where the thermocouple reference junctions, 12a and 14a, are located as described above. Thus, and as shown schematically in FIG. 1, the amplifier OA together with the thermocouple reference junctions, 12a and 14a, are located in the stable oven 60 to be described in greater detail with specific reference to FIG. 2.

Still with reference to FIG. 1, the output of operational amplifier OA in line 24 is fed to a second differential D.C. amplifier 26 which second amplifier 26 is also operated closed loop as indicated generally by the feedback loop 28. The second amplifier 26 is also referenced to the isolated common potential level as indicated generally at 16. The output of the operational amplifier OA is actually fed to the negative terminal of the differential amplifier 26, and a reference input to the positive terminal of the differential amplifier 26 is preferably provided in the form of a manually presetable voltage, determined by means of a thumb wheel switch 32. The thumb wheel switch 32 embodies a sensitive potentiometer by means of which a set temperature can be provided as a reference from which the differential amplifier 26 operates. This potentiometer embodied by the thumb wheel switches (not shown) is referenced to the D.C. output voltage of the rectifier 18 and the differential amplifier 26, like the operational amplifier OA, is driven from this same source of power, and is referenced to the isolated common potential 16 referred to hereinabove. It should perhaps be noted that the output in line 24 might be used to drive a visual readout device (not shown) for a direct indication of temperature. However, the differential amplifier 26 and thumb wheel switch 32 are provided to preset a desired temperature, actually to preset a voltage input to the differential amplifier 26, so that this amplifier 26 can compare the preset value with the actual value from the operational amplifier OA to produce a difference signal in line 27. This difference signal from line 27 is adapted to drive a meter M, which meter is also referenced to the isolated common potential 16.

The isolated circuitry of FIG. 1 further includes a potentiometer 34 to provide a reference voltage for a pulse width modulating amplifier 36, which reference voltage is directly related to the setting of the thumb wheel switch 32 and the output of operational amplifier OA line 24. A pulse generator 38 is adapted to produce a "saw tooth" output at a frequency set by the potentiometer 46, and with a gradient or voltage-time slope dictated by the setting of still another potentiometer 44. The potentiometer 44 comprises a proportioning band potentiometer and provides a positive input to pulse width modulating (PWM) differential amplifier 36. The output of said (PWM) amplifier 36 comprises a rectangular waveform, the width of each such rectangular pulse being determined by the reference voltage input to the negative terminal of the differential amplifier 36, and hence to the voltage difference between the thumb wheel setting of switch 32, and the voltage level in the output line 24 associated with the operational OA. Both the differential amplifier 36 and the ramp pulse generator 38 are driven by the source of D.C. power 18, and are tied to the isolated reference potential 16 referred to above. The differential amplifier 36 is operated with feedback as indicated generally at 35, and its output in line 37 comprises a binary coded signal well suited for use in driving an optical coupling device 40 as a result of its simplified "on/off" vs. time signal. A light emitting diode 40a is energized when the "on" signal is present in line 37, and the isolated common potential 16 is necessarily used at this side of the optical coupling device 40. A photosensitive transistor 40b conducts to provide a "de-isolated" control signal in the line 48 when the diode 40a is so energized.

Still with reference to FIG. 1, an electrically driven heater 50 is provided in the zone, generally proximate to the thermocouple transducer 10, and is adapted to be operated in response to the magnitude of the difference signal from line 27. More particularly, the electrical heater 50 is adapted to be selectively driven from the source of A.C. power 52 through a triac 54, the tirac being triggered from an A.C. power amplifier 42 whenever a de-isolated control signal is present in line 48. The A.C. power amplifier 42, and its associated trigger to the triac 54, as well as its associated input from the line 48, are adapted to be referenced to any convenient ground potential as indicated generally at 46, such ground potential need not bear any electrical relationship to the isolated common potential 16 described above. An optical coupling device 40 is provided for de-isolating a binary signal, produced from the analog signal in line 27, in order to allow the signal in line 48 to be useable in equipment such as amplifier 42, which is grounded to any convenient ground source, that is to a ground potential not related to the isolated common potential 16 defined at the center tap of the secondary winding of the transformer 19 as described above. It will be apparent that the heater 50 can be caused to operate for a portion of each cycle, as determined by this frequency set at potentiometer 46 and as dictated by the voltage level of the difference signal in line 27. As a result of judicious selection of the settings for potentiometers 44 and 46 as well as the potentiometer 34, it is possible to fit the system of FIG. 1 to a particular environment and to optimize the cyclical operation of the heater in a manner similar to a conventional time proportional controller for a convenient temperature regulating system.

Considering next the component oven shown in FIG. 2, the reader is referred to the issued U.S. Pat. No. 3,414,705, referred to previously, for a detailed description of a stable oven suitable for receiving the operational amplifier OA and associated thermocouple reference junctions 12a and 14a as described above. However, and by way of brief summary, FIG. 2 shows such an oven as comprising a cup-shaped aluminum holder 62, which holder has a generally U-shaped cross section as seen in FIG. 2. The base portion of the holder has openings for receiving the thermocouple conductors 12 and 14 as well as their associated "non-critical" lead out wires 13 and 15. The side walls of the cup-shaped holder 62 are surrounded by an annular ring 64 of PTC material. Such a material is a semi-conductive one which displays a relatively steep positive sloped resistivity-temperature curve or plot, and can be used as a heat generating element which is self regulating as described in the above mentioned patent. Two electrical lead out wires 66 and 68 are provided for energizing the PTC element 64, and these are preferably connected to the secondary winding of the transformer 19 so that the electrical energy used to operate the oven of FIG. 2 is necessarily referenced to the isolated source of common potential 16.

The cup-shaped holder 62 may be anodized on its outer surface in order to improve its electrical insulation properties without sacrificing the desirable electrical conduction of aluminum. In the alternative, the same result can be achieved by use of a suitable thermoplastic resin coating in this area. A tubular casing 70 fabricated from nylon or other thermally and electrically insulating material is provided outside the ring shaped PTC element 64, and outside the lead wires 66, 68 associated therewith. This insulating casing 70 has a radially inwardly oriented flange adapted to overlie the radially outwardly projecting flange of the cup-shaped holder 62. The capsule 17, as described herein above with reference to FIG. 3, is adapted to fit within the lower portion of the cup-shaped holder 62 and the operational amplifier OA is fabricated to fit within the remaining portion of the cup-shaped holder, and to have its characteristic 5 lead out wires projecting upwardly through the opening defined by the flanged casing member 70. A cover member 72, also fabricated from an insulating material, is fitted around the casing 70 and may be formed of the same plastic thermally and electrically insulating material, such as nylon. A cover 73 closes the top of the oven, and a disc 74 is provided at the lower end of the casing 70. Suitable openings are provided in both the disc 74 and cover 73. The disc 74 has openings for receiving the lines, 66 and 68 associated with the heating element 64, and also for receiving the thermocouple leads 12 and 14 and their associated non-critical leads 13 and 15. The cover 73 has similar openings for the 5 leads of the amplifier OA. The operational amplifier OA and the capsule 17 may be held in the cup-shaped holder 62 by means of a potting compound 74 having good thermal conductive properties. On the other hand, a thermally insulating potting compound is provided in the voids defined outside of the cup-shaped holder 62 and inside the casing 70 to further improve the efficiency of the FIG. 2 oven. As a result of this oven construction it will be apparent that the operational amplifier OA is located in close thermal relation to the PTC heating element 64 resulting in very efficient control of its temperature, and of the temperature of the junctions 12a and 14a in the capsule 17. Such an oven is available commercially from the assignee herein and is sold under their KLIXON trademark as Model No. 4ST1. Such an oven is adapted to control the temperature within the cup-shaped holder at approximately 115°C plus or minus 5°C when operated from a 24 volt A.C. source as described above. More particularly, the temperature shift caused by voltage variation to the oven is only on the order of 4/10ths degree centigrade per volt change. When the oven is given 3 minutes within which to warm up, the voltage gain of the operational amplifier is not only held linear, but is also quite thermally stable, and hence quite satisfactory when used in a circuit of the type described hereinabove.

I claim:

1. In a thermocouple circuit wherein two dissimilar conductors define a transducer for generating a thermal e.m.f. proportional to the temperature difference between said transducer and the electrically connected reference junction of said dissimilar conductors the improvement comprising:

a. A thermal stable environment means providing a reference temperature for forming a thermocouple reference junction,
   b. A source of electrical energy for generating a voltage which is referenced to a stable common potential,
   c. Amplifying means for said thermal e.m.f., said amplifying means driven from said electrical energy source, and said amplifying means having its output referenced to said stable common potential said amplifying means disposed in said thermal stable environment means, and
   d. An optical coupling device for isolating the output of said amplifying means from ground potential.

2. The combination of claim 1 wherein said source of electrical energy comprises a source of A.C. line voltage, a transformer with a shielded secondary winding, said secondary winding having a center tap which provides said stable common reference potential.

3. The combination of claim 2 wherein said amplifying means comprises operational amplifier, and wherein said source of electrical energy further includes a rectifier driven by said shielded secondary winding of said transformer, and said rectifier having a symmetrical D.C. output referenced to said stable common potential, said operational amplifier driven by said symmetrical D.C. output and said amplifier being referenced to said common potential.

4. The combination of claim 3 further including a differential amplifier driven by said symmetrical D.C. output and also referenced to said common potential, a manually presettable voltage input to said differential amplifier, said differential amplifier having a second input which is the output of said operational amplifier whereby the output of said differential amplifier provides a control signal proportional to the difference between said preset voltage and the output voltage from said operational amplifier.

5. The combination of claim 4 further including a heater located proximately to said temperature transducer, and means for selectively operating said heater means in response to said control signal, said optical coupling device providing a de-isolated control signal for said heater operating means whereby said heater operating means need not be referenced to said isolated common potential.

6. The combination of claim 4 further including ramp pulse generating means, potentiometer means for varying the gradient of each of the ramp pulses produced by said pulse generating means, pulse width modulating means for producing rectangular pulses proportional in width to the magnitude of said control signal and proportional in frequency to the frequency of said pulse generating means, said rectangular pulses providing a temperature coded control signal which is in binary form and hence well adapted to being de-isolated by said optical coupling device.

* * * * *